United States Patent [19]

Murakami et al.

[11] Patent Number: 4,814,063

[45] Date of Patent: Mar. 21, 1989

[54] PROCESS FOR THE PREPARATION OF SUPER NEEDLE COKE

[75] Inventors: Tadashi Murakami, Yokohama; Mikio Nakaniwa; Yoshio Nakayama, both of Tokyo, Japan

[73] Assignee: Nippon Kokan Kabushiki Kaisha, Tokyo, Japan

[21] Appl. No.: 96,268

[22] Filed: Sep. 8, 1987

Related U.S. Application Data

[63] Continuation of Ser. No. 772,737, Sep. 5, 1985, abandoned.

[30] Foreign Application Priority Data

Sep. 12, 1984 [JP] Japan .................. 59-189493

[51] Int. Cl.$^4$ .................. C10B 55/00; C10G 69/06
[52] U.S. Cl. .................. 208/50; 208/57; 208/58; 208/61; 208/89; 208/131
[58] Field of Search .................. 208/13, 22, 49, 50, 208/57, 58, 61, 131, 89, 254 H

[56] References Cited

U.S. PATENT DOCUMENTS

| | | | |
|---|---|---|---|
| 3,617,495 | 11/1971 | Zimmerman et al. | 208/50 |
| 3,702,816 | 11/1972 | Buchmann et al. | 208/50 |
| 3,817,853 | 6/1974 | Folkins | 208/50 |
| 3,839,484 | 10/1974 | Zimmerman et al. | 208/61 |
| 4,043,898 | 8/1977 | Kegler | 208/131 |
| 4,066,532 | 1/1978 | Garcia | 208/131 |
| 4,108,761 | 8/1978 | Sze et al. | 208/254 H |
| 4,108,798 | 8/1978 | Sze et al. | 208/50 |
| 4,137,150 | 1/1979 | Pietzka et al. | 208/131 |
| 4,138,325 | 2/1979 | Beuther et al. | 208/50 |
| 4,292,170 | 9/1981 | Simone | 208/131 |
| 4,333,816 | 6/1982 | Kölling et al. | 208/131 |
| 4,446,004 | 5/1984 | Chen et al. | 208/61 |
| 4,466,883 | 8/1984 | Eickemeyer | 208/131 |
| 4,547,284 | 10/1985 | Sze et al. | 208/131 |

FOREIGN PATENT DOCUMENTS

| | | | |
|---|---|---|---|
| 49-11442 | 3/1974 | Japan | 208/89 |
| 51-41129 | 2/1976 | Japan | 208/50 |
| 51-136704 | 11/1976 | Japan | 208/131 |
| 52-78201 | 1/1977 | Japan | 208/131 |
| 52-285013 | 3/1977 | Japan | 208/131 |
| 57-198788 | 6/1982 | Japan | 208/50 |
| 59-122585 | 7/1984 | Japan | 208/50 |

*Primary Examiner*—Anthony McFarlane
*Attorney, Agent, or Firm*—Fleit, Jacobson, Cohn & Price

[57] ABSTRACT

Described is the method of producing the super needle coke from graphite electrodes, wherein the starting material derived from coal tar or the starting material derived from coal tar and containing less than 0.1 weight percent of the dry sludges or quinoline insolubles is subjected to hydrogenation in the present of hydrogenation catalyst to give the hydrogenated oil which is further subjected to thermal cracking under the controlled condition and non-volatile components contained in thermally cracked oil are removed to give the starting coking material from the distillate these of which is subjected to delayed coking.

The thermal cracking conditions are selected from the conditions in which the pressure range is up to 3.9 MPa (40 kg/cm$^2$G.). The temperature is 470° to 520° C. and the cold residence time is to to 350 seconds, while the coking conditions are selected from the conditions in which the temperature ranged is over 450° to 465° C. and the pressure range is over 0.19 to 0.98 MPa (2 to 10 Kg/cm$^2$G).

10 Claims, 1 Drawing Sheet

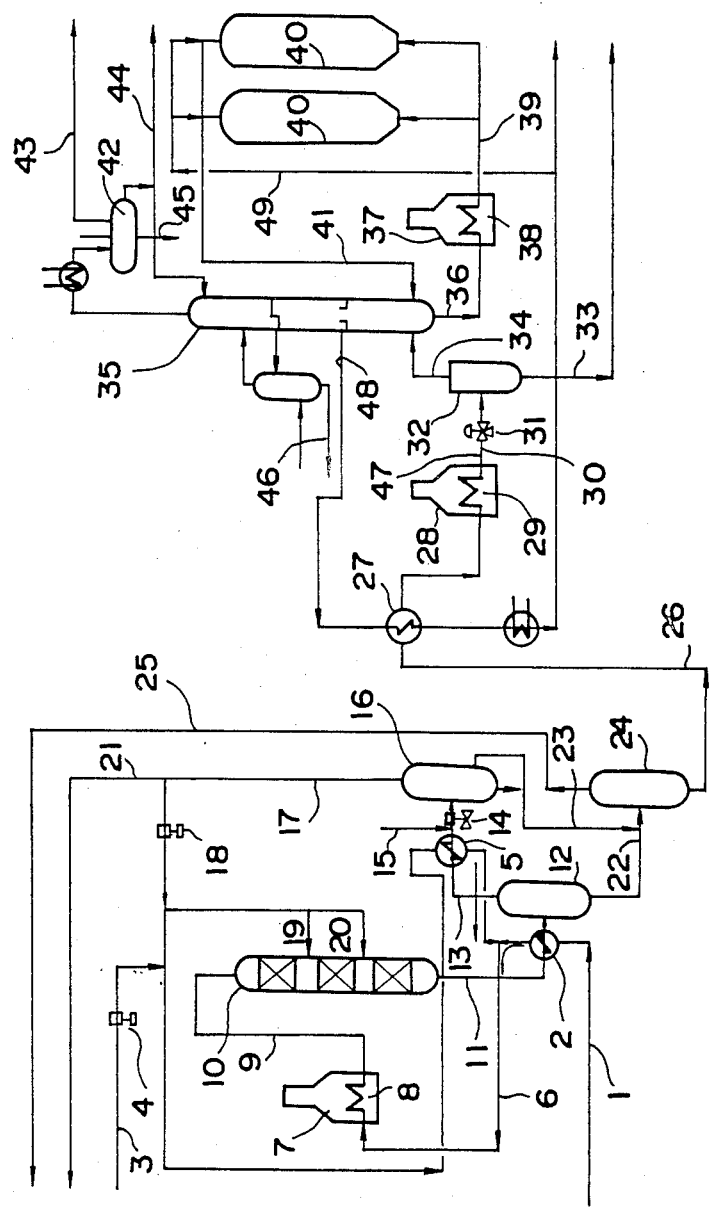

PROCESS FOR THE PREPARATION OF SUPER NEEDLE COKE

This application is a continuation of application Ser. No. 772,737, filed Sept. 5, 1985, now abandoned.

BACKGROUND OF THE INVENTION

1. Field of the Invention

This invention relates to a process for the preparation of the high-quality needle coke from coal tar (hereinafter referred to as CT), coal tar pitch (hereinafter referred to as CP), which is separated from CT, or the heavy oil derived from coal, or the like, said needle coke being suitable for the preparation of the graphite electrode that is used in the ultra-high power operation (UHP-operation) required in the steel making in an electric furnaces and which is suitable for the preparation of graphite electrodes capable of withstanding quick melt conditions. It also relates to the process for the preparation of the high-quality needle coke or super needle coke also suitable for the preparation of graphite electrodes of the lengthwise graphitization system (LWG system) which recently has come into notice.

2. Description of the Prior Art

For realizing a graphite electrode that will withstand quick melt conditions for the UHP operation of the electric furnace and exhibit good performance in practice, it is required of the coke to have a low electrical resistivity and a low coefficient of thermal expansion (hereinafter referred to as CTE), while it is required of the graphitized product to have low modulus of elasticity and high strength. It is also required that, in view of the tendency towards the larger size of the electrodes, that the coke material be homogeneous in quality.

In order to meet such requirements, a notable improvement has been made in the quality of the so-called needle coke (hereinafter referred to as N-coke) derived from petroleum or coal sources. In view of the properties desired of the N-coke, it is also known under the name of easily graphitizable coke or high crystalline coke.

The carbon material generally prepared by coking the starting coking material typically at the coking temperature of 430° to 470° C., also known as raw N-coke or green N-coke, is composed of aggregates of graphite-like fine crystallites of hexagonal system with the mean size of the order of 1nm (10 Å). The properties of the N-coke for the preparation of the high-quality graphite electrodes as mentioned hereinabove are known to depend on the orientation of and the binding force acting among these crystallites.

The formation of these crystallites is markedly affected in a known manner by the state of generation of the fine optically anisotropic mesophase spherules from which the bulk mesophase are formed by coalescence of small spherules and the growth thereof finally resulting in the coke precursors upon heating the starting coking material.

On the other hand, the mesophase spherules are affected by such factors as the composition of the starting coking material, impurities that obstruct the growth of the mesophase spherules, and the coking conditions, so that it is by no means easy to specify the N-coke structure.

However, the CTE is the independent property of the N-coke which is solely determined at the stage of the raw coke formation in the coking reaction, its history in terms of CTE being extended even after the graphitization stage and cannot improve any more.

For this reason, the current practice in the commercial circles is to mainly classify the grades of N-coke as a function of the CTE values.

Although the N-coke grades are not necessarily dependent solely upon the CTE values, as a general rule, those N-cokes having the CTE values, shown as an average value over the temperature range of 100° to 400° C., of the order of 1.00 to $1.15 \times 10^{-6}$/°C., are indicated as premium-grade N-coke or PN-cokes, while those having the CTE value in the range of 1.15 to $1.25 \times 10^{-6}$/°C. are indicated as the regular grade needle coke, regular N-coke or RN-coke.

Compared to the RN-coke, the PN-coke has a large crystal size, superior crystal orientation and a high real density, so that it may be said to be superior in graphitizability.

When the CT or the CP derived from CT is coked as such by direct coking, the resulting coke is notably inferior to the RN-coke and practically unusable for the preparation of the graphite electrode.

The essential conditions for the preparation of the high grade N-coke usable for the preparation of the graphite electrode for the purpose of UHP operation are meticulous sorting or selection and refining of the starting coking material.

For example, it is described in the Japanese Patent Laid Open Specification No.78201/1977 to separate or eliminate quinoline insolubles (QI) out of CP through selection of the ratio of the aromatic solvents mixed with CP and being coked the resulting material by the conventional delayed coking. It is described in the Japanese Laid-Open Patent Publication No. 28501/1977 to eliminate the QI components out of the hydrocarbon material containing said QI components and the condensed ring hydrocarbon compounds by using a solvent the 95 volume percent of which has the boiling point lower than 330° C. and the BMCI value of which is in the range of 5 to 70, then to remove the solvent and being coked the resulting product by conventional delayed coking to the desired N-coke.

It should be noted that the methods described in these two publications are intended for QI removal and that, when the starting materials prepared from these known methods are used for coke manufacture, while it is indeed possible to obtain the PN grade coke in terms of CTE values, however, swelling or puffing phenomena was undesirably observed when using such coke for the preparation of the graphite electrode in accordance with the LWG system.

Such puffing phenomena is also seen to occur with the N-coke grade which is of substantially the same grade as that obtained from the petroleum sources. However, such puffing is mainly ascribable to the sulphur contained in the coke and, in general, may easily be controlled by the addition of iron oxides as anti-puffing agent. It should be noted that such puffing preventive measures are not effective in the case of the coking material derived from coal sources.

It is also known that the graphite electrode from the PN-coke manufactured from the material derived from coal sources is excellent in mechanical strength but slightly inferior in tenacity to the similar electrode derived from petroleum sources.

Although the reason for these defects is not known precisely, it is generally thought that gases desorbed from hetero atoms contained in the coke, such as N, 0 or S and the texture of the carbon material are playing some part in the course of the electrode graphitization.

The QI components present in the starting coking material accelerate the coking rate, but such material becomes affixed to the surface of the mesophase spherules in the course of the coking reaction and obstructs the mesophase growth, the coke texture thus obtained becoming the micro mosaic structure instead of bulk mesophase.

Further the bulk mesophase is not turned into the fibrous texture even upon heat treatment in the course of the subsequent coking reaction so that the resulting product is not the high grade N-coke suitable for the production of the graphite electrode.

It is therefore necessary that the QI contents in the starting material be removed from the starting coking material or be converted into components that are innocuous to the coking reaction.

Not withstanding the forgoings, the use of QI-free starting coking material does not necessarily give rise to a high quality N-coke, thus posing another problem.

This phenomenon is outstanding especially in case of using a starting coking material derived from coal, sources such as CT or CP.

For example, it is supposed that the QI components are removed by any suitable method from CT or CP to give QI-free CT(QI-F-CT) or QI-free CP(QI-F-CP) as starting coking material, which is then coked by conventional delayed coking at a pressure of about 0.3 MPa (3 kg/cm$^2$ G) at a lower coking temperature of, for example, 440° C. The coke thus obtained may have a CTE comparable to that of the PN-coke. However, when the same starting material is subjected to the coking reaction under the more higher coking temperature of, for example, 445° C., 450° C. or 460° C., and other conditions being the same, the CTE of the resulting coke is of the same order of magnitude as or even inferior to that of the RN-coke. Thus, with rising in the coking temperature, the CTE value is increased rapidly while the coke properties are notably lowered.

In this connection, it may be surmised that certain ingredients contained in the QIF-CT or QIF-OP are not harmful to the formation of good bulk mesophase with good fibrous texture when coked under a comparatively lower coking temperature, but which obstruct generation of the bulk mesophase with the fibrous texture as the coking temperature is increased because of the coking rate of such ingredients then become large.

Although it is difficult to discern or specify such components responsible for such behaviors, this unidentified substance is referred to herein as DRRC (dormant rapid reaction component excited by temperature).

For preparing the high-quality N-coke from the DRRC containing starting material, it is necessary to convert DRRC into components innocuous to the coking reaction or to remove DRRC out of the system in any way to prevent DRRC from taking part in the coking reaction. Delayed coking at an elevated coking temperature becomes possible only subject to such a treatment as stated above.

It is thought that some DRRC may be inherently an intrinsic component of the QIF-CT or QIF-CP, while the other DRRC may be subsequently formed during the course of preliminary heat treatment or in the course of coking reaction.

It will be noted that about 10 and 20 weight percent of n-heptane insolubles (hereinafter referred to as nC7-I) are contained in QIF-CT and QIF-CP, respectively.

This nC7-I is a mixture with complex chemical structures of polycondensed aromatic compounds with polyfunctional groups inheriting the chemical structure of coal.

The nC7-I can be separated into toluene soluble components (hereinafter referred to as TS), and toluene insoluble components (hereinafter referred to as TI), amounting to ca. 6.5 to 10 percent and 3.5 to 10 percent, respectively.

TI components of asphaltenes are soluble to quinoline, also known as pre-asphaltenes, are a high molecular weight material containing about 4 percent of hetero atoms, mainly oxygen atoms.

The TS components also contain about 4 percent of hetero atoms. The nC7-I derived from petroleum sources differs in the respect that it essentially consists only of TS components and it is mainly composed of C and H.

Unexceptionally, these undergo gradual changes in their chemical structure by hydrogenation or thermal cracking. In view of the fact that starting coking material derived from thermally cracked oil which, substantially free of nC7-I or TI components thereof, does not show the DRRC-induced phenomena during the coking reaction, and in addition the heteroatoms present in the starting coking material generally obstruct the formation of the highquality coke, it is thought that contained in QIF-CT or QIF-CP, if involved thereof components that exhibit the function heretofore described as DRRC.

Since the coking reaction proceeds associated with numerous components subjected to a strong intermolecular reaction, it has not been feasible to make a scrutiny of these by looking at individual components.

As we investigate into the conditions leading to formation of SN-coke (super needle coke) through modifying or excluding materials which induce DRRC, the percentage of the conversion or reduction of the nC7-I and TI based on those contained original QIF-CP under the relatively moderate hydrogenation conditions with the denitrogenation (de-N) percentage in the hydrocracked oil based on the nitrogen content of original QIF-CP equal to 15 percent were 21.4 and 38.6 percent respectively. These values amounted to 62.5 and 74.5 percent under the severe conditions when the de-N percentage equals to 80 percent.

It is obvious from above that, while the amounts of nC7-I and TI could be reduced by hydrogenation, it is still difficult to completely convert or reduce them into other components solely by hydrogenation.

The distributions of the nC7-I and TI components in the hydrogenated oil derived from QIF-CP is such that trace amounts of nC7-I are observed in the 350° to 521° C. cut or fraction for the de-N percent of 15 percent and the nC7-I and TI remained are found to be distributed in the fraction of 521° C. to the heavy-end when the de-N percent higher is than 15 percent.

On the other hand, the amount of heavy ends in the same hydrogenated oil with the boiling range above 521° C. is expectedly decreased with increase in the de-N percentage. That is, for the de-N percent in the range of 15 to 80 percent, the conversion or reduction ratio to the same heavy ends of the same boiling range of QIF-CP amounted to 44 to 60 percent.

The contents of nC7-I and TI in the same heavy ends of the hydrogenated oil amounted to 44 to 30 percent and 16 to 10 percent, respectively, meaning that much nC7-I and TI are yet contained in the heavy ends.

There is described in the Japanese Patent Publication No. 11442/1974 the method of modifying the coal tar pitch by hydrogenation to a pitch material having a chemical structure likely to produce easily graphitizable needle coke. However, the SN coke cannot be obtained even if the material produced in this manner is used as such as the starting coking material.

In the Japanese Patent Publication No. 41129/1976, there is described the method for the preparation of the pitch coke from the tar pitch derived from petroleum sources and that derived from coal sources.

According to this method, the starting tar pitch is alkylated and thereafter modified in the presence of the hydrogenation catalyst.

However, by these methods, the QI components are still contained in the starting coking material so that it is not possible to obtain the starting coking material for SN-cokes schemed to provide by the present invention.

The thermal cracking subsequent to hydrogenation results in a further increase in the percentage of conversion due to cracking or reduction of the heavy ends in the hydrogenated oil. The overall cracking or reduction percentage based on the heavy end portion of the QIF-CP as a result of the hydro- and thermal-cracking amounts to 67.5 to 72.5 percent for the de-N percent of 15 to 80 percent, which means a further increase of 23.5 to 15 percent points over the value obtained by hydrogenation.

On the other hand, the overall conversion or reduction percent of the nC7-I amounts to 20.3 to 60.5 percent whereas that of TI amounts to 26.9 to 75.3 percent. Thus the value for nC7-I is apparently nearly equal to that obtained by hydrogenation, while that for the TI component is decreased about 10 percent below the value obtained by hydrogenation for the de-N percent of 15 percent, but it is substantially not changed for the de-N percent of 80 percent.

The conversion or reduction percentage of the heavy ends with the boiling point above 521° C., obtained upon direct thermal cracking of QIF-CT or QIF-CP but without hydrogenation, is about 50 percent at most, whereas the conversion or reduction percentage of the former is only 7 percent and that of the latter is increased to more than twice. Even if the thermal cracked oil obtained in this manner is processed as described above, it has been completely impossible to obtain as middle cut the starting coking material free of nC7-I and TI or DRRC.

Therefore, in order to process QIF-CT or QIF-CP to produce the starting coking material for SN-cokes, both the hydrogenation and the thermal cracking contiguous thereto are indispensable, or inseparable from each other. Although DRRC can be separated by the hydrogenating step alone, subject to a suitable selection of the de-N percentage, the coke yield of the middle cut as the starting coking material obtained by subjecting the hydrogenated oil in situ to flashing is extremely low, as is the practical value of such starting coking material. On the other hand, thermal cracking alone is not subservient to the object of the present invention because it fails to lead to complete DRRC separation.

SUMMARY OF THE INVENTION

The present invention has been made in order to overcome the aforementioned drawbacks and contemplates to provide a super needle coke for graphite electrodes at a high yield, said coke being homegeneous and low in CTE, electrical resistivity and modulus of elasticity and high in mechanical strength. The present inventors have conducted researches into the relation between the method of modification and the composition or structural properties of CT and CP or QIF-CT and QIF-CP and arrived at the present invention. According to one aspect of the present invention, there is provided a method for the preparation of the coke comprising the steps of hydrogenation of the starting material selected from the carbon containing materials containing less than 0.1 weight percent of QI contents or dry sludge as CT or CP in the presence of the hydrogenation catalyst to give the hydrogenated oil, the step of thermally cracking the hydrogenated oil under pressure and a temperature not higher than 520° C. to give a thermally cracked oil, and the step of removing the lighter end fraction and the non-volatile matter from the thermally cracked oil to give a residual product which then is subjected to delayed coking under pressure and the conditions in the temperature range of 445° to 470° C.

More in detail, the hydrogenated oil obtained under the moderate hydrogenation condition with the de-N percentage of 15 percent is heated to an ultimate temperature of 470° to 520° C. under pressure up to about 3.9 MPa (40 kg/cm$^2$ G) for further thermal cracking of the heavy portion of the hydrogenated oil. The thermally cracked oil thus obtained is then introduced into the flasher to give the middle cut free of the ligher end fraction and the non-volatile matter having a boiling point higher than 520° to 538° C. or more. From said middle cut is obtained at a high yield the starting coking material of which DRRC has been substantially removed.

The following results may be expected upon practicing the present invention.

(i) It is possible to maintain CTE of the coke at the level comparable to that of the SN-coke and to carry out the operation at the coking temperature notably higher than the temperature at which the PN-coke is obtained from the conventional coal tar material, thus allowing to reach the desirable VCM content of the raw coke.

(ii) The anti-puffing effect much higher than that achievable with the method consisting solely of hydrogenation may be achieved at the lower range of the de-N percent (iii) The above may lead to an improved overall homogenity and to a more efficient method for the production of the coke.

BRIEF DESCRIPTION OF THE DRAWINGS

The drawing is a view showing the steps for illustrating the manufacture of the super needle coke according to the present invention.

DESCRIPTION OF THE PREFERRED EMBODIMENTS

For obviating the problems inherent in the prior-art method, the present inventors have conducted various researches into the method of modification concerning the structural properties and the composition of CT or CP, QIF-CT or QIF-CP, and found that, when the material is subjected under controlled conditions to hydrogenation, the resulting hydrogenated oil is subjected in situ to thermal cracking and the remaining cuts substantially free of nC7-I and TI are separated from the thermal cracked oil so as to be used as starting coking material, the latter is substantially free of DRRC and shows coking temperature dependency of the CTE of the coke to a considerably smaller extent obtained upon delayed coking, and that the N-coke with a lower CTE than that of PN-coke, a further improved graphitizability and with puffing lowered to a practically negligible degree, that is, the SN-coke, can now be produced.

The starting material for coking may be introduced into a coke drum for coking at the temperature of 445° to 470° C. for the preparation of SN-coke grade coke.

The thermal cracking contiguous to the hydrogenation results in a further increase in the conversion percentage of the heavy ends of the hydrogenated oil such that the overall conversion percentage of the heavy ends of the hydrogenated oil throughout hydrogenation and thermal-cracking amounts to as much as 67.5 to 75.2% for the deN percentage of 15 to 80 percent, which represents an increase of additional 23.5 to 15 percent points as compared to that obtained by hydrogenation.

Similarly, the overall conversion or reduction percentage for nC7-I and that for TI amounts to 20.3 to 60.5 percent and to 26.9 to 75.3 percent, respectively. For nC7-I, such percentage is apparently substantially equal to that achieved with the method consisting solely of the hydrogenation. For TI components, the conversion percentage tends to be lowered for the de-N percentage of 15 percent by about 10 percent as compared to that achieved with the method of hydrogenation, while the same percentage for the de-N of 80 percent is substantially unchanged from the value achieved with the method of hydrogenation.

Under the severe hydrogenation conditions with the de-N percentage of 70 percent, the aromaticity (fa) of the resulting hydrogenated oil is now equal 0.53, which means a marked change from that of the starting material. By processing such hydrogenated oil in the same manner as described hereinabove, the yield of the non-volatile material of the heat cracked oil is decreased to about less than 50 percent as compared to the yield of the case in which the starting material is subjected solely to thermal cracking, the resulting product being substantially free of QI.

Similarly, the increase in CTE of the coke resulting from delayed coking of the middle cuts with the rise in the coking temperature, is so low that it may be judged that DRRC has been substantially removed from the starting coking material.

It has also been found that the coke shows good graphitizability, a high real density and substantially negligible puffing, while the graphitized product shows a high in Young's-Modulus and a low mechanical strength.

Similar preliminary researches at the de-N percentage of 15 to 80 percent revealed that the hydrogenation conditions that will satisfy the properties of the SN-coke are in the range of 19.0 to 46.5 percent and more preferably in the range of 22.0 to 37.4 percent in terms of the de-N percentage. The structural parameter of the hydrogenated oil corresponding to these optimum conditions is 0.79–0.69 and 0.78–0.72 in terms of aromaticity (fa).

The reactor used for the hydrogenation reaction need not be of any specific structure but may be designed as a conventional fixed or fluid bed type system.

The operating conditions of the hydrogenation reactor may be suitably selected from the temperature range of 350° to 450° C., the pressure range of about 3.9 to 24.5 Mpa (40 to 250 kg/cm$^2$ G) and the liquid hourly space velocity (LHSV) range of 0.2 to 2.0 hr$^{-1}$.

The hydrogenated oil thus obtained is subjected to a MODERATE-THERMAL CRACKING. More precisely, the thermal cracking may be achieved by maintaining the outlet temperature of ca, 470° to 520° C. in a tubular heating furnace maintained under the pressure of the order of e.g. about 2.45 to 3.9 MPa (25 to 40 kg/cm$^2$ G)

The catalyst used in the present invention is that in which one or more metals showing the hydrogenation activity are supported on the alumina-containing porous carrier.

By the alumina-containing porous carrier are meant the porous metal oxide carrier consisting mainly of alumina, silica alumina, alumina zirconia or alumina titania, molded products consisting of the aforementioned carrier and the clay substance as third ingredients, or the like.

The metals showing the hydrogenation activity are selected from the group of metals of chromium, molybdenum, tungsten, iron, cobalt and nickel, such as for example, Ni-Mo or Ni-Co, supported on alumina.

When the stationary bed catalyst is used, QIF-CT or QIF-CP is preferably used as the starting material to prevent occlusion of the catalyst surface and the resulting premature deactivation.

When the fluid bed type reactor is used, there is no limitation on the starting material so that any desired starting material may be used without inconvenience.

The residence time of the thermal cracking is usually about 60 to 350 seconds. The thermal cracked oil thus obtained is fed to a flashing tower where it is subjected to flashing under the setting of 370° to 510° C. and about 0.01 to 0.3 MPa (0.1 to 3 kg/cm$^2$A) for separating the non-volatile components from the tower bottom while allowing the distillate from the top to be condensed to yield an oily substance from which to obtain the starting coking material.

This coking material is coked by the conventional delayed coking method. The temperature at this time is critical for production of the SN-coke and need to be determined as a function of the volatile combustible matter (VCM) of the raw coke, CTE, strength, young modulus, etc. The temperature range is preferably 445° to 470° C. and more preferably 450° to 465° C. The coking pressure of about 0.19 to 0.98 MPa (2.0 to 10 kg/cm$^2$ G) is usually sufficient, while the coking time duration is about 24 hours and occasionally of the order of 36 hours.

The starting material used for the coke production according to the present invention may include CT or CP obtained by dry distillation of coal, QIF-CT or QIF-CP obtained by processing the CT or CP, liquid products obtained by direct hydrogenative cracking of coal, SRC liquid product or the like of heavy oil derived from coal, or liquid product such as shale oil. However, the processing conditions are not uniform since the properties of these starting materials are thought to be changed markedly as a function of their hysteretic condition.

An embodiment of the present invention making use of the QIF-CP as starting material is hereinafter explained by referring to the accompanying drawing.

In the drawing, QIF-CP is conveyed through piping 1, heated at 2, elevated in pressure in a compressor 4 via piping 3, united via piping 6 with a hydrogen gas of 99.9% purity which has been heated in a heater 5, the resulting mixture then being heated in a heating furnace 7 to the conditions of the hydrogenation reactor.

The mixture of the heated starting material QIF-CP and the hydrogen gas is conveyed through coil 8 and piping 9 to the top of a hydrogenation reactor 10 to then flow down through catalyst layers.

Since the reaction is exothermic, the cold hydrogen gas is supplied in circulation through piping 19 and 20 into the internals between the catalyst layers for quenching and controlling the reactor temperature. The effluent from the reactor 10 is taken out via piping 11 to be conveyed via preheater 2 to a hot flashing drum 12 where it is divided into gaseous and liquid components.

The heated gas is conveyed through piping 13 and heaters to be cooled in an air cooler 14 to then be conveyed to a cold flashing drum 16. The washing water is conveyed via piping 15 to the upstream side of the air cooler 14. The sour water, vapor and liquid components of the hydrocarbon are separated in the cold flashing drum 16.

The recycle gas is conveyed via piping 17 and compressed in a recycle gas compressor 18 to then be united with part of the starting hydrogen so as to be recycled via piping 19, 20 to a reaction zone of the reactor. The hydrogen-rich gas is purged via piping 21 for adjusting the pressure of the reaction system. The liquid products from the cold flashing drum 16 and the hot flashing drum 12 are taken out via piping 22, 23, respectively, and conveyed to a stripper 24 where light cuts are removed via piping 25.

The hydrogenated oil taken out at the bottom of the stripper 24 is heated at 27 via piping 26 so as to be cracked in a thermal cracking furnace 28 under the conditions mentioned hereinabove. The thermal cracked oil is flashed in a flashing tower 32 via coil 29, piping 30 and a pressure control valve 31. The non-volatile components are separated and removed from the bottom of the flashing tower 32 via piping 33, whereas light components are supplied via piping 34 to the bottom of the combination tower 35.

The coker drum effluent is supplied to the bottom of the combination tower 35 via piping 41. Both of these components are fractionally distilled with the heavy components being taken out via piping 36 as coker feed so as to be heated in a coil 38 of a coker heating furnace 37 to a temperature sufficient for maintenance of coking reaction and then be supplied via piping 39 to coking drums 40 for delayed coking. These coking drums 40 are driven by rotation on the 24-hour basis.

From the top of the combination tower 35, off gases (piping 43), light tar oil (piping 44) and waste water (piping 45) are recovered via condenser 42. The light cuts are recovered at the piping 46 and separated further into carbolic oil, naphthalene oil and wash oil in a separate system, not shown.

Part of the wash oil is used in a piping 47 for quenching the thermal cracked oil. Part of the heavy oil taken out of the piping 48 is supplied via piping 49 to an effluent line at the top of the coking drum tower so as to be used for quenching.

The present invention will now be explained by referring to certain Examples and Comparative Examples.

EXAMPLE 1

The QIF-CP with a specific gravity of (15/4° C.) 1.2439, QI (weight percent): <0.1, TI (weight percent): 8.96, nC7-I (weight percent): 19.1, S-content (weight percent): 0.49, N-content (weight percent): 1.13, fa: 0.96, is used as the starting material, and subjected to hydrogenation under the following hydrogenation conditions:

| Hydrogenation Conditions (l: liter) | | |
| --- | --- | --- |
| Hydrogen/starting oil | Nl/l | 1000 |
| Reaction temperature | °C. | 360 |
| Reaction pressure | MPa | 17.6 |
| | (kg/cm²G) | (180) |
| LHSV | hr⁻¹ | 1.0 |

The following are the properties of the resulting liquid hydrogenation product.

| Properties of Hydrogenated Oil | |
| --- | --- |
| Specific Gravity 15/4° C. | 1.154 |
| QI, wt. % | 0 |
| nC7-I, wt. % | 11.7 |
| TI, wt. % | 3.89 |
| S, wt. % | 0.10 |
| N, wt. % | 0.74 |
| fa | 0.735 |

It is seen from these results that, with the de-N percentage of 34.5 in the hydrogenation of QIF-CP the hydrogenated oil does not contain QI, but contains both nC7-I and TI. These components are unexceptionally contained in the heavy portion having the boiling point above 459° C., and said heavy portion accounts for about 49.5 weight percent of the hydrogenated oil (nC7-I:23.5 percent; TI:7.36 percent) Despite the fact that the de-N percentage is 34.5 percent, neither nC7-I nor TI components are removed only by hydrogenation.

Then, the hydrogenated oil is fed as such to a thermal cracking tube where it is thermal cracked at a pressure of 2.45 MPa (25 kg/cm²G) and a temperature of 500° C. (with cold resident time of 240 seconds). The oil is then fed to a flashing tower maintained at 490° C. and atmospheric pressure. The non-volatile components are then removed from the tower bottom, whereas the light boiling components with the boiling point lower than 280° C. are removed from the hydrogenated oil obtained upon cooling the vapor at the tower top. The remaining oil is used as the starting coking material with the following properties.

| Properties of Starting Coking Material | |
| --- | --- |
| Specific Gravity (15/4° C.) | 1.0925 |
| QI, wt. % | 0 |
| nC7-I, wt. % | 0.05 |
| TI, wt. % | 0 |

The starting coking material thus obtained is subjected to delayed coking for 24 hours under a temperature of 460° C., a pressure of 0.64 MPa (6.5 kg/cm² G) and a recycle ratio of 0.7.

After the oil is charged for delayed coking, steam purging is carried out as conventionally. Then, the green coke is recovered. The yield of the green coke based on the original starting material and the VCM contents amount to 21.0 percent and 8.5 percent, respectively.

The green coke is then calcined as conventionally at 1400° C. for 1.0 hour and crushed and pulverized. The pitch was then added as binder and kneaded to the resulting product. The kneaded mixture was the extruded and made then in the form of an extrusion rod baked at 1000° C. and graphitized at 2700° C. The following are the physical properties of the resulting in graphite artifact calcined and graphite artifact.

$$\frac{\text{Calcined coke}}{2.154 \text{ g/cc}} : \text{Real Density (15/4° C.)}.$$

$$\frac{\text{Graphite Artifact}}{0.89} : \text{CTE (W.G.)} \times 10^{-6} /°\text{C.},$$

maximum transverse magnetic reluctance (MR)%, 13.3; flexural strength (kg/cm$^2$), 134; Young's modulus (kg/cm$^2$), 830

It is seen from the above Table that the calcined coke thus obtained has the real density of higher than 2.15, and notably low CTE, extremely higher MR, good graphitizability and an extremely low Young's modulus of graphite artifact. These properties are favorable in comparison with the Young's modulus of 880 to 1000 kg/mm$^2$ or higher of the graphite artifact derived from the petroleum sources having the same order of magnitude of CTE as that of the aforementioned inventive product.

Then, for measuring dynamic puffing (DP), the coke calcined as mentioned hereinabove is crushed and sieved out the fractions with the particle size distribution in the range from 35 to 65 meshes and in the range less than 200 meshes, respectively. Then, a sample mixture consisting of 67 weight percent of the 35 to 65 mesh size portion and 33 weight percent of the portion less than 200 meshes is molded with addition of a suitable amount of the binder pitch (under the pressure of 86.1 MPa (879 kg/cm$^2$) to a mold plug with an I.D. equal to 4 inches. From this mold plug is then cut out a plug element with 1 inch I.D. and 1 inch long. After the size is measured in advance with a micrometer, the plug element is set on a dilatometer and the changes in size are measured over the temperature range from 1200° to 2700° C. at the temperature rising rate of 14° per minute.

The DP value ($\Delta L\%$, the difference between $\Delta L\%$ the maximum temperature and $\Delta L\%$ at the minimum temperature values; $\Delta L\%$ the percentage of change in length VS. temperature) amounts to plus 0.00 or almost zero percent in the present emboidment, which may be said in effect not to represent the puffing. The yield of the non-volatile components recovered from the flasher is 11.6 weight percent, whereas QI is less than 0.1 weight percent.

EXAMPLE 2

The procedure of Example 1 is followed except that the temperatures of 440° C.(A), 450° C.(B), 455° C.(C), 465° C.(D) and 470° C.(E) are used instead of using the coking temperature of 460° C.. The results are shown in the following Table.

| Run No. | Green Coke VCM wt. % | Graphite Artifact (Graphitized at 2700° C.) | |
|---|---|---|---|
| | | CTE × 10$^{-6}$/°C. | MR % |
| A | 16.7 | 0.78 | 13.8 |
| B | 12.0 | 0.83 | 13.6 |
| C | 10.5 | 0.86 | 13.4 |
| * | 8.5 | 0.89 | 13.3 |
| D | 8.1 | 0.96 | 3.2 |
| E | 7.0 | 1.04 | 12.9 |

*Data of Example 1

In the Table A, B and C represent the case in which the coking temperatures of 440° C., 450° C. and 455° C. are used for the starting coking material of the Example 1. Because of the slow coking rate of the starting coking material, the delayed coking for 24 hours is not enough for the material to be coked entirely into the form of green coke.

For this reason, the VCM of the green coke is fluctuated considerably in the coking drum with its mean value becoming more than 10 weight percent thus not satisfying with the requirement for VCM of the super needle coke.

At the middle and the upper portions of the coke drum, however, the green coke was formed. Thus this coke portion is cut out and CTE and MR are measured. Hence, these A, B and C are not industrially practicable under these coking temperature conditions, but the DRRC components have been removed.

EXAMPLE 3

The procedure of the Example 1 is repeated except that the following hydrogenation conditions are used instead of those shown in Example 1.

| Hydrogenation Conditions | |
|---|---|
| Hydrogen Oil, Nl/l | 1000 |
| Reaction Temperature, °C. | 360 |
| Reaction Pressure, MPa (kg/cm$^2$G) | 4.9 (50) |
| LHSV, hr$^{-1}$ | 0.75 |

The following are the properties of the resulting hydrogenated oil and the starting coking material (de-N percentage of 15%)

| | Properties of Hydrogenated Oil and Starting Coking Material | |
|---|---|---|
| | Hydrogenated oil | Starting Coking Material |
| Specific Gravity (15/4° C.) | 1.1923 | 1.1512 |
| QI, wt. % | 0 | 0 |
| nC7-I, (wt. %) | 15.0 | 0.50 |
| TI, wt. % | 5.50 | 0 |
| S, wt. % | 0.19 | — |
| N, wt. % | 0.96 | — |

The green coke yield is 23.7%; CTE(W.G.) and MR of the graphite artifact (2700° C.) are $1.08 \times 10^{-6}$/° C. and 12.2 percent, respectively, and thus comparable with those of the PN-coke. The DP (6 L%) value is +0.08.

EXAMPLE 4

The hydrogenated oil samples F, G, H and I with different de-N percentage are prepared by changing solely the hydrogenation conditions of the Example 1. The graphite artifact are ultimately prepared by otherwise repeating the procedure of the Example 1. The characteristics of these samples are as shown below:

| | | Graphite Artifact | | |
|---|---|---|---|---|
| | de-N % | CTE × 10$^{-6}$/°C. | MR % | Young's Modulus kg/nm$^2$ |
| F | 23.1 | 0.91 | 13.0 | 735 |
| * | 34.5 | 0.89 | 13.3 | 830 |

-continued

| | Graphite Artifact | | | |
|---|---|---|---|---|
| | de-N % | CTE × $10^{-6}$/°C. | MR % | Young's Modulus kg/nm$^2$ |
| G | 37.6 | 0.84 | 13.4 | 865 |
| H | 42.5 | 0.85 | 14.0 | 915 |
| I | 76.1 | 0.78 | 13.8 | 1120 |

*Example I

The samples F to I fall under the grade of super needle coke in terms of CTE and MR. The larger the de-N percentage, the smaller the CTE and also the larger the MR becomes, which is desirable. However, the Young's Modulus is abnormally high and undesirable as the de-N percent exceed above 42.5 percent

COMPARATIVE EXAMPLE

The starting oil (CT) having the following properties: (Specific Gravity, 15/4° C. 1.1452; QI wt. % 0.1;(TI wt.% 3.48; nC7-I, wt. % 11.0; S, wt. % 0.44 and N. wt. % 0.98) is dirctly subjected to thermal cracking without hydrogen treatment and others is carried out in accordance with Example 1.

The oil is thermally cracked at the temperature of 480° C. and under the pressure of 2.45 MPa (25 kg/cm2 G), and then fed to a flasher maintained at the temperature of 480° C. under a atmospheric pressure. The nonvolatile components are removed from the bottom, while the distillate are removed at the top by cooling the steam from which starting coking material shown below in the table was obtained.

Delayed coking were conducted under five different temperature conditions of 440°, 450°, 455°, 460° and 465° C. for which designate run No. of J. K. L. M and N, respectively, under the pressure 20 of 0.3 MPa (3 kg/cm$^2$ G), and others were then carried out in accordance with Example 1.

| Properties of Starting Coking Material | |
|---|---|
| Specific Gravity, 15/4° C. | 1.1638 |
| QI, wt. % | 0.1 |
| nC$_7$-I, wt. % | 3.2 |
| TI, wt. % | 0.2 |
| S, wt. % | 0.66 |
| N, wt. % | 1.10 |

| Coking Conditions and Coke Properties | | | | | |
|---|---|---|---|---|---|
| | Run No. | | | | |
| | J | K | L | M | N |
| Coking Temperature, °C. | 440 | 450 | 455 | 460 | 465 |
| Green Coke VCM, wt. % | 16.4 | 10.0 | 9.7 | 8.3 | 7.0 |
| Graphite Artifact | | | | | |
| CTE, × $10^{-6}$/°C. | 0.93 | 1.06 | 1.17 | 1.20 | 1.43 |
| MR, % | 12.0 | 11.1 | 10.7 | 10.1 | 19.8 |

Similarly to the Example 4, the CTE and MR of samples J and K in the Table above are measured on the samples taken out of the coke drum of which the portions with extremely high VCM contents were previously removed.

The VCM of L, M and N were lower than 10 weight percent, while the CTE of L and M were in the range of RN-coke grade and the MR were also low.

It clearly can be seen that Run No. N is very poor quality and does not even fall under the RN-grade coke. The difference in CTE between J and N is extremely high and almost reaches 0.5, which means that thermal cracking only applied on CT without hydrogenation and otherwise the same procedure as that of Example 1 is not enough to remove completely DRRC from the starting coking material.

Since the S and N contents in the starting coking material were almost the same as those contained in the original starting material, the de-S and de-N effect can not be expected from the heat cracking. The DP (ΔL%) for Run No. K amounts to +0.24 % indicating puffing.

COMPARATIVE EXAMPLE 5

The hydrogenated oil obtained in Example 1 was treated to remove a fraction lighter than 280° C. The resultant oil, which had the following properties: (Specific Gravity, 15/4° C. 1.1219; QI, wt. % 0.1; TI wt. % 3.76; nC$_7$-I, wt. % 12.0; S, wt. % 0.11; N, wt. % 0.75) was directly subjected delayed coking at the temperature of 450° C. and under the pressure of 3 kg/cm$^2$G and others were carried out in accordance with Example 1. The results are shown in the Table below.

| Coke Properties | |
|---|---|
| Green coke VCM, wt. % | 9.0 |
| Graphite Artifact CTE, × $10^{-6}$/°C. | 1.11 |
| MR, % | 11.5 |

What is claimed is:

1. A method of producing super needle ccoke, comprising the steps of:
    selecting a coal tar or coal tar pitch containing less than 0.1 weight percent of quinolin insolubles contents or dry sludge;
    hydrogenating said coal tar or coal tar pitch feestock in the presence of a hydrogenation catalyst to give a hydrogenated oil;
    feeding said hydrogeneated oil to a thermal cracking reactor, to thermally crack said hydrogeneated oil at a temperature in the outlet of the reactor of not higher than 520° C., a pressure of not higher than 3.9 MPa (40–kg/cm$^2$G) and a residence time of 60 to 350 seconds and to give a cracked oil;
    obtaining a distillable product from said cracked oil by removing non-volatile components having a boiling point higher than 520° C. from said cracked oil and by removing light boiling components having a boiling point lower than 280° C. from said cracked oil; and
    coking saids distillable product at a temperature of 445° to 470° C. and a pressure of 0.19 to 0.98 MPa (2 to 10 kg/cm$^2$G).

2. A method of producing super needle coke, comprising the steps of:
    hydrogeneating a coal tar or coal tar pitch feedstock in the presence of a hydrogenation catalyst to give a hydrogenated oil;
    feeding said hydrogenated oil to a thermal cracking reactor to thermally crack said hydrogenated oil at a temperature in the outlet of the reactor of not higher than 520° C., a pressure of not higher than 40 kg/cm$^2$G and a residence time of 60 to 350 seconds and to give a cracked oil;

removing non-volatile components having a boiling point higher than 520° C. and light boiling components having a boiling point lower than 280° C. to obtain a distillable product; and coking said distillable product at a temperature of 445° to 470° C. and a pressure of 2 to 10 kg/cm$^2$G.

3. A method according to claim 2, wherein the hydrogeneating step is carried out by in a fixed catalyst bed reactor or a fluid catalyst bed reactor.

4. A method according to claim 2, wherein the hydrogeneating step is performed under conditions so that the hydrogenated oil has a denitrification of higher than 19.0% based on the nitrogen content of the feedstock.

5. A method according to claim 2, wherein the hydrogenating step is performed under such conditions that the hydrogenated oil has a denitrification of 22.5 to 46.5% baed on the nitrogen content of the feedstock.

6. A method according to claim 2, wherein the hydrogenating step is performed under such conditions that the hydrogenated oil has a denitrification of 23.7 to 37.4% based on the nitrogen content of the feedstock.

7. A method according to claim 2, wherein the step of removing the non-volatile components is effected by flashing said cracked oil.

8. A method according to claim 2, wherein the coking step is performed at a temperature of 450° to 465° C.

9. A method according to claim 2, wherein the coking step produces super needle coke having a true density of higher than 2.14 g/cm$^3$.

10. A method according to claim 2, wherein the feedstock has a quinoline insoluble content of less than 0.1% by weight.

* * * * *